United States Patent [19]
Sigmon

[11] 3,888,460
[45] June 10, 1975

[54] BALL VALVE COMPRESSION SEAT
[75] Inventor: James W. Sigmon, Charlotte, N.C.
[73] Assignee: Sigmon Corporation, N.C.
[22] Filed: Mar. 18, 1974
[21] Appl. No.: 451,784

[52] U.S. Cl. ................. 251/315; 137/315; 251/152
[51] Int. Cl. .............................................. F16k 5/06
[58] Field of Search .......... 251/315, 192, 157, 170, 251/171, 152, 84; 137/315

[56] References Cited
UNITED STATES PATENTS

| | | | |
|---|---|---|---|
| 2,932,311 | 4/1960 | Scherer | 251/315 X |
| 3,077,895 | 2/1963 | Vickery | 251/315 X |
| 3,195,857 | 7/1965 | Shuker | 251/170 X |
| 3,380,709 | 4/1968 | Scaramucci | 251/192 X |
| 3,705,707 | 12/1972 | Scaramucci | 251/315 X |

Primary Examiner—Martin P. Schwadron
Assistant Examiner—Robert J. Miller
Attorney, Agent, or Firm—Parrott, Bell, Seltzer, Park & Gibson

[57] ABSTRACT

Opposite sides of the ball of the present valve are engaged by non-deformable seat rings. Plastic compression rings which are capable of being deformed to a limited extent are positioned between each of the seat rings and the adjacent portion of the valve body. Inward pressure is applied against the plastic rings to resiliently urge the seat rings inwardly against opposite sides of the ball and to maintain the seat rings in sealing engagement with the ball.

5 Claims, 4 Drawing Figures

BALL VALVE COMPRESSION SEAT

This invention relates generally to spherical plug valves or ball valves of the type which include a rotatable ported valve member with sealing seat rings at opposite sides of the valve member.

In an attempt to provide a long-lasting seal which requires a minimum turning torque for rotating the ported ball valve, it has been proposed to form the seat rings, or at least the ball engaging portions thereof, of a plastic-like material having a very low co-efficient of friction, such as nylon, or Teflon, which is "flexible" or at least deformable to a limited extent. The use of such plastic seat rings against the metallic ball valve does result in a reduction in the amount of torque required to rotate the ball valve, however, this type of plastic seat ring is susceptible to rather rapid wear and tear with rotation of the ball valve so that it has a very short useful life. The short useful life of this type plastic seat ring is attributed primarily to the fact that a portion of the seat ring is out of contact with the spherical surface of the valve member as the port in the valve member passes over it and the flow of liquid through the valve tends to push this portion of the seat ring into the path of the oncoming port of the valve member as it is closing. This causes this portion of the seat ring to be sheared off so that a perfect seal with the spherical surface of the valve member is not maintained.

With the foregoing in mind, it is an object of the present invention to provide seat rings on opposite sides of the ball valve which are formed of a hard and relatively non-deformable material, such as metal, and to provide a plastic pressure or compression ring capable of being deformed to a limited extent on each side of the seat rings. The plastic compression rings are positioned between the seat rings and the adjacent portion of the valve body so that as inward pressure is applied against the plastic rings, the seat rings are resiliently urged inwardly against opposite sides of the ball and maintain the seat rings in sealing engagement with the ball so that the seat rings are not drawn inwardly into the ported valve as it rotates and therefore are not subjected to a shearing or wearing action by the port in the ball as it rotates.

In the embodiment of the invention illustrated in the drawings, a "floating" type of metallic ball valve is provided so that the line pressure will force the ball toward the downstream side and apply a load against the downstream seat ring so as to effect a seal at this downstream side of the valve. The plastic compression ring positioned between the downstream seat ring and the valve body applies a resilient pressure against the seat ring to maintain a good sealing contact between the seat ring and the spherical surface of the ball. However, it is to be understood that the present invention may also be embodied in a valve of the type having a "fixed" ball which is not free to float. In this case, the amount of compression to be applied to each of the seat rings on opposite sides of the ball may be calibrated and maintained at the desired level, regardless of any line pressure applied to the ball by the liquid which is being controlled.

Other objects and advantages will appear as the description proceeds when taken in connection with the accompanying drawings, in which FIG. 1 is an isometric view of a ball valve constructed in accordance with the present invention;

Figure 1:
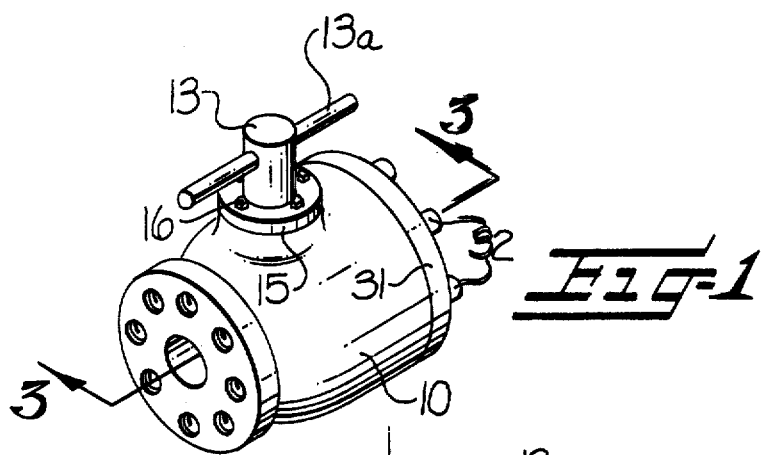
Figure 2:
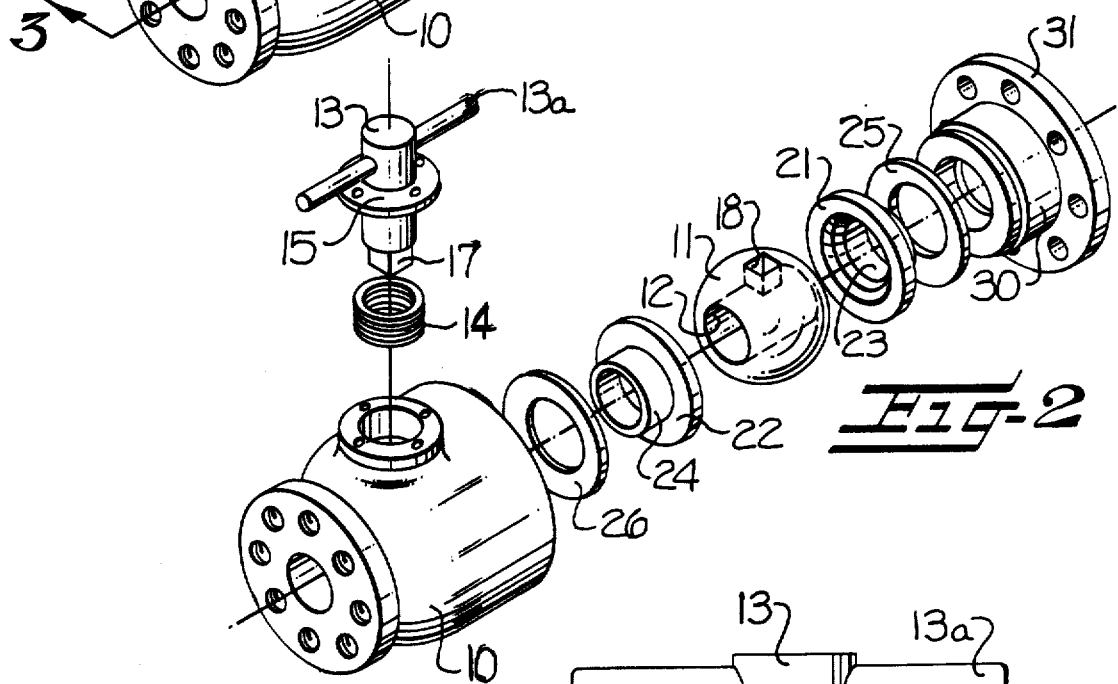
FIG. 2 is an exploded isometric view of the ball valve, illustrating the component parts thereof.

The ball valve shown in the drawings is typical of one type of valve with which the present invention may be associated and includes a valve housing or body 10 which may be connected by any suitable means to any desired type of piping, not shown. A spherical valve member or ball 11 is supported in the body 10 and is provided with a fluid passageway 12 extending therethrough.

Means, in the form of stem 13 having a turning handle 13a, is provided for turning the ball 11 between open and closed positions. To form a seal between the stem 13 and the valve body 10, the usual packing rings 14 surround the stem 13 and a compression ring 15 is held against the upper portion of the body 10 by screws 16.

The lower end of the stem 13 is provided with a rectangular tongue 17 which is adapted to extend into a socket 18 in the upper end of the ball 11 which extends transversely of the fluid passageway or port 12. Since the socket 18 is larger than the tongue 17, the ball 11 will, in effect, be "free floating" when the port 12 is moved to the closed position.

Figure 4:
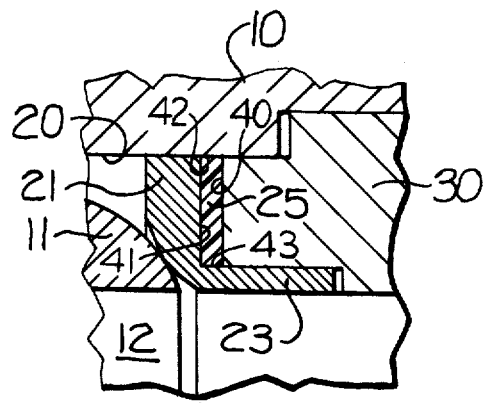
FIG. 4 is an enlarged fragmentary view of that portion of FIG. 3 enclosed within the dash-dot rectangle indicated at 4.
Figure 3:
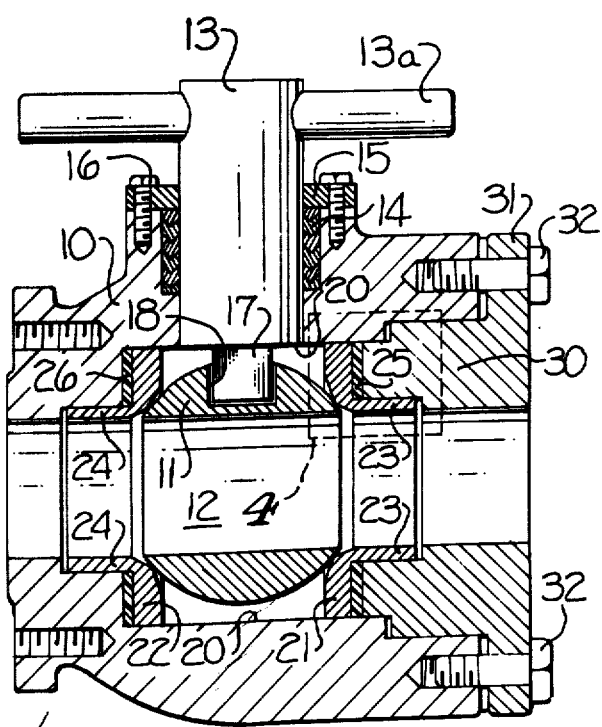
FIG. 3 is an enlarged vertical sectional view taken through the ball valve and along the line 3—3 in FIG. 1.

The ball 11 is supported for rotation in an enlarged valve chamber 20 in the valve body 10 and between seat rings 21, 22 engaging opposite sides of the ball 11 and defining the inner ends of the inlet and outlet openings in the valve body 10. The seat rings 21, 22 are formed of a relatively hard or noncompressible material, such as non-corroding metal. The seat rings 21, 22 are provided with respective annular sleeve portions 23, 24 which extend outwardly away from the ball 11 and along the bore extending through the valve body. The seat rings 21, 22 are each provided with a central bore which forms an extension of the bore extending through the valve body 10. Each of the seat rings 21, 22 defines with cooperating portions of the valve body axially opposing surfaces 40, 41 (FIG. 4) extending generally perpendicular to the bore through the valve body. Additionally, each of the seat rings 21, 22 defines with the valve body circumferentially opposing surfaces 42, 43 (FIG. 4) extending generally parallel to the bore through the valve body. Together, the opposing surfaces 40, 41, 42, 43 define the boundary of a confining volume.

Plastic pressure or compression rings 25, 26 are positioned between the respective seat rings 21, 22 and the adjacent portions of the valve body 10 and are compressively confined within the confining volume defined by the opposing surfaces, 40, 41, 42, 43. Means, to be presently described, is associated with the valve body 10 for applying inward pressure against the plastic rings 25, 26 to resiliently urge the seat rings 21, 22 inwardly against opposite sides of the ball 11 and to maintain the seat rings 21, 22 in sealing engagement with the ball 11.

The plastic compression rings 25, 26 may be formed of any suitable material which is capable of being deformed or compressed to a limited extent. The plastic compression rings 25, 26 must be resistant to fluids likely to be carried by the valve, must have stable characteristics over a wide temperature range, and must be compressible or deformable to a limited extent. It has been found that one of the fluorocarbon plastics, i.e., polytetrafluoroethylene, sold by DuPont under the trademark Teflon, provides a suitable material for formation of the compression rings 25, 26.

The means associated with the valve body for applying inward pressure against the plastic compression rings 25, 26 is illustrated in the drawings as comprising an annular plug 30 extending into the enlarged valve chamber 20 with its inner end in engagement with the outer surface of the plastic ring 25. The plug 30 is provided with a mounting flange 31 and screws 32 extend through the flange 31 and are threadably embedded in the valve body 10. The screws 32 may be tightened into the valve body to thereby apply pressure against the plastic ring 25 and thereby resiliently urge the seat rings 21, 22 inwardly against opposite sides of the ball 11.

It is to be understood that other means may be provided for applying inward pressure against the plastic rings to resiliently urge the seat rings 21, 22 inwardly against opposite sides of the ball 11 and to maintain the seat rings 21, 22 in sealing engagement with ball 11. Since the seat rings 21, 22 are formed of a hard, non deformable material, such as metal, the fluid pressure does not have a tendency to deform the seat rings 21, 22 so that the rings 21, 22 are not damaged by wear and tear of the bore 12 engaging the same, as is the case where plastic seat rings are provided. Also, the plastic compression rings 25, 26 resiliently urge the seat rings 21, 22 inwardly against opposite sides of the ball 11 and maintain the seat rings 21, 22 in sealing engagement with the ball 11. Thus, the ball valve of the present invention will withstand extremely high pressure and shock loads, and also will seal satisfactorily under both high and low pressures. Since the seat rings 21, 22 are resiliently urged against opposite sides of the ball 11, the amount of friction between the seal rings and the ball may be predetermined so that a minimum turning torque is required for any particular pressure rating.

It is to be understood that the compression rings 25, 26 also provide body seals for the valve of this invention, in that the rings prevent flow of fluid passing through the conduit in which the valve is inserted into those portions of the valve body which surround the rectangular tongue 17 of the stem 13 and are diametrically opposite the stem 13. This sealing function flows, at least in part, from the compression rings 25, 26 contacting the entirety of the boundary surfaces 40, 41, 42, 43 of the confining volume defined between the seat rings and the valve body. Thus, the rings 25, 26 perform dual functions.

In the drawings and specification there has been set forth a preferred embodiment of the invention, and although specific terms are employed, they are used in a generic and descriptive sense only and not for purposes of limitation.

That which is claimed is:

1. A fluid flow controlling valve comprising:
   a valve body having a conduit extending therethrough for guiding fluid flow from an upstream portion thereof toward a downstream portion thereof,
   a valve member defining a spherical segment surface and mounted within said body portion for rotation about an axis perpendicular to said conduit and between flow permitting and flow blocking positions for controlling flow of fluid through said conduit,
   seat ring means mounted within said body and encircling one of said upstream conduit portion and said downstream conduit portion for sealingly engaging said spherical segment surface of said valve member and cooperating with said valve member for sealing against fluid flow through said valve upon rotation of said valve member to the flow blocking position,
   said valve body and said seat ring means having axially opposing surfaces extending generally perpendicular to said conduit and having circumferentially opposing surfaces extending generally parallel to said conduit and said opposing surfaces defining the boundary of a confining volume,
   resilient thermoplastic compression seal means compressively confined within said confining volume for exerting on said seat ring means force biasing said seat ring means into engagement with said valve member, said seal means contacting the entirety of said boundary surfaces of said confining volume for sealing against leakage flow between said valve body and said seat ring means, and
   means for applying to said seal means compressive force directed axially of said conduit for maintaining said seal means in compressive confinement and thereby for maintaining sealing engagement between said valve member and said seat ring means.

2. A fluid flow controlling valve according to claim 1 wherein said compression seal means consists of a unitary annular body of thermoplastic.

3. A fluid flow controlling valve according to claim 1 wherein said seat ring means is formed of metallic material.

4. A fluid flow controlling valve according to claim 1 wherein said seat ring means comprises a pair of seat rings arranged for engaging opposite sides of said valve member and for forming inner ends of said upstream and downstream portions of said conduit extending through said valve body and further wherein said compression seal means comprises a pair of compression rings each compressively confined within a confining volume defined between said valve body and a corresponding one of said pair of seat rings whereby both sides of said valve member are engaged and sealed.

5. A fluid flow controlling valve according to claim 1 wherein said compression seal means comprises polytetrafluoroethylene.

* * * * *